Figure 1:
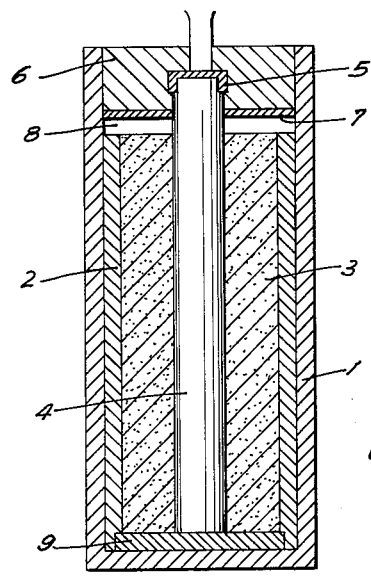

May 2, 1961     E. VOSS     2,982,806

ELECTRIC CELL

Filed Nov. 12, 1957

INVENTOR.
Ernst Voss
BY
Michael S. Striker
Attorney

United States Patent Office 2,982,806
Patented May 2, 1961

2,982,806

ELECTRIC CELL

Ernst Voss, Frankfurt am Main, Germany, assignor to Pertrix-Union Gesellschaft mit beschraenkter Haftung, Ellwanger, Jagst, Germany Filed Nov. 12, 1957, Ser. No. 695,641

Claims priority, application Germany Nov. 15, 1956

11 Claims. (Cl. 136—30)

The present invention relates to an electric cell, and more particularly it relates to either a primary or a secondary electric cell of improved corrosion resistance.

Conventional electric cells, whether primary cells which cannot be recharged electrically or secondary cells in which the electrochemical action is reversible, and particularly electric cells which include a zinc electrode, have a limited shelf life, especially when such cells are exposed to somewhat elevated temperatures such as exist for instance in a tropical climate. Under such conditions severe corrosion of the zinc electrode takes place and the storability of the cell is reduced to an unsatisfactory short period of time.

It has been attempted to reduce the corrosion of the zinc electrode by making the same of zinc of high purity which primarily should be substantially free of arsenic, cadmium and iron. For instance, the applicable German standards prescribe an iron content of less than 0.02%. The lead content of the zinc which improves its rolling properties, should not exceed 1%. Furthermore, it has been attempted to improve the corrosion resistance of zinc in electric cells by the addition of chromates whereby a protective chromate film is to be formed on the surface of the zinc electrode. These attempts are for instance described in "Primary Batteries," by G. W. Vinal, New York, 1951, wherein it is stated that such chromate films have found commercial use as inhibitors in dry cells, and that at higher temperatures the results obtained by the addition of potassium dichromate are better than those which are obtained by adding mercuric chloride.

It has also been suggested to use organic inhibitors as protective agents for the zinc electrode. Such organic inhibitors are also described by Vinal who indicates that organic compounds containing the carbonyl group, such as furfural and heterocyclic nitrogen-containing compounds like quinaldine were found to be effective in retarding the corrosion of zinc in dry-cell electrolytes, but that many of these substances could not be used in the completed cells since they either reacted with the paste wall or formed an insoluble film over the surface of the zinc anode. According to Vinal, certain colloidal materials normally found in the paste wall of the dry cells do have inhibiting properties, provided that they contain a colloidal protein.

However, notwithstanding the aforementioned attempts to overcome the corrosion of zinc electrodes particularly in warmer climates or under conditions of somewhat elevated temperatures, it was up to now not possible to produce an electric cell in which the zinc electrode would withstand corrosive influences under the above adverse conditions for the desired length of time.

It is therefore an object of the present invention to overcome the above described disadvantages.

It is another object of the present invention to provide an electric cell which may be stored for prolonged periods of time even at elevated temperatures without being subject to excessive corrosion of the zinc electrode.

It is a further object of the present invention to produce in a simple and economical manner an electric cell of superior corrosion resistance.

It is yet another object of the present invention to provide means for protecting a zinc electrode in an electric cell against excessive corrosion.

Other objects and advantages of the present invention will become apparent from a further reading of the description and the appended claims.

With the above and other objects in view, the present invention mainly comprises in an electric cell, in combination, a zinc electrode, a substance selected from the group consisting of mercury and mercury salts, and a thallium salt, whereby corrosion of the zinc electrode is retarded due to the presence of the substance and the thallium salt.

In a preferred embodiment, the present invention contemplates in an electric cell, in combination, a zinc electrode having a predetermined surface area, and a liquid electrolyte having dissolved therein mercuric chloride in a quantity of about 4 grams per liter of the electrolyte, the liquid electrolyte also containing a thallium salt in a quantity corresponding to between 2 and 6 milligrams of metallic thallium per square centimeter of the surface area.

Thus, according to the present invention, the cell contains in addition to mercury or mercury salts also a thallium salt which apparently in coaction with the mercury will maintain the surface of the zinc solution electrode for a considerable length of time in clean, smooth condition. Thus, the corrosion resistance of the zinc electrode is improved according to the present invention without complicating the manufacture of the electric cell and without any significant increase in costs.

Salts of thallium which is nobler than zinc and capable of forming an amalgam with mercury, have been found to be surprisingly effective in the combination of the present invention for reducing corrosion of the zinc electrode even over prolonged storage periods and under adverse storage conditions, to a degree which could not be reached heretofore.

The thallium salt as well as the mercury salt (if mercury is added in the form of a salt) may be dissolved or suspended in the electrolyte, or may be worked in solid form into the active mass of a storage battery or secondary cell or into the depolarizer of a primary cell. The mercury may also be introduced in metallic form or as amalgam of the surface layer of the zinc electrode.

As electrolytes according to the present invention, conventional electrolytes may be used such as ammonium chloride/zinc chloride or magnesium chloride, if desired with the addition of other alkaline earth chlorides or manganous chloride. In alkaline primary cells provided with zinc electrodes, potassium hydroxide is customarily used as electrolyte. The present invention is also applicable to such alkaline cells.

As an example of secondary cells or storage batteries, primarily the combination of zinc-lead dioxide with sulfuric acid as electrolyte is to be mentioned. The above referred to electrolytes do not react with the thallium salts according to the present invention, since the salts of the monovalent thallium which exclusively are to be used as additions for protection against corrosion, show good solubility in the aqueous solutions of the above electrolytes. In this connection it must be noted that in the case of an aqueous solution of for instance potassium hydroxide, a reaction between the same and the thallium salt does take place, however, the thallium hydroxide which is formed thereby is easily soluble in water so that also in this case no precipitation of the thallium compound takes place. Similar conditions exists when a zinc sulfate-containing sulfuric acid electrolyte is used such as is customarily included in zinc-lead dioxide storage batteries.

Figure 2:
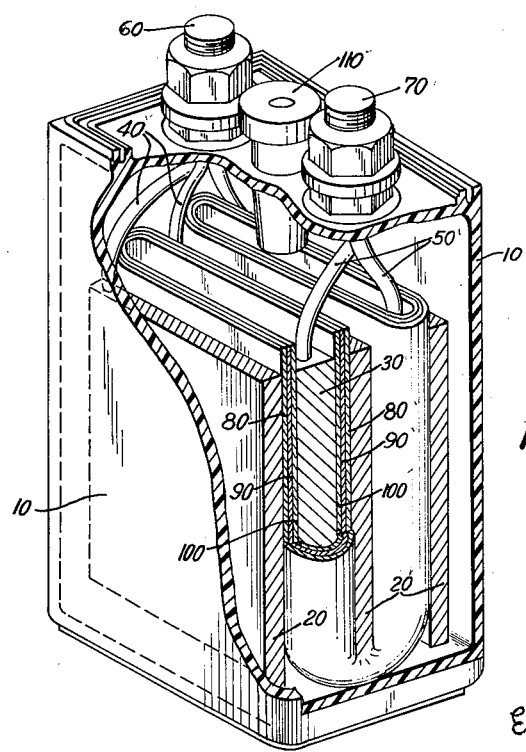

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational cross sectional view of a primary cell according to the present invention; and Fig. 2 is a perspective view, partially in cross section, of a secondary cell according to the present invention.

Referring now to the drawings and particularly to Fig. 1, zinc cup 1 is shown the inner face of which may be amalgamated. Reference numeral 2 indicates the thickened electrolyte, reference numeral 3 the depolarizer mixture. The term "liquid electrolyte" as used in the appended claims comprehends within its meaning also "thickened electrolyte" as hereinafter described. The carbon rods are indicated by reference numeral 4. The cell also includes brass cap and connector 5, cardboard 7, air space 8, sealing mass 6 and cardboard bottom plate 9.

The thallium salt may be incorporated either in electrolyte 2 or in the depolarizer mixture 3.

Fig. 2 illustrates a storage battery with zinc electrode, which may contain a thallium salt according to the present invention. The storage battery consists of container 10 made of synthetic plastic material, negative zinc electrodes 20, positive electrodes 30 which contain lead dioxide as active mass, lugs 40 of the negative electrode, lugs 50 of the positive electrode, the negative pole 60 and the positive pole 70 of the storage battery, the outer separator 80, the ion-permeable separator 90, the inner separator 100 and the plug 11 for closing the opening through which the liquid electrolyte (not shown) can be introduced into the storage battery. The thallium salt is contained either in the liquid electrolyte or in the active mass of the positive electrodes.

The following examples of specific embodiments of electric cells according to the present invention are given as illustrative only, the invention however not being limited to the specific details of the examples.

EXAMPLE I

A cylindrical galvanic cell according to the present invention comprises a zinc cup as negative electrode, while the positive electrode consists of a manganese dioxide-graphite mixture which is pressed about a carbon rod. The electrolyte contains per 100 liters water, 30 kg. ammonium chloride and 7.5 kg. zinc chloride. In order to reduce the corrosive effect of the electrolyte on the zinc electrode, according to the present invention, 4 grams mercuric chloride are added per liter of the electrolyte. The electrolyte is thickened in customary manner with between 150 and 300 grams of flour per liter of electrolyte. The thallium salt such as thallium sulfate are either dissolved in the electrolyte or mixed in subdivided solid condition into the depolarizer mixture. Between 2 and 6 milligrams of thallium per square centimeter of the inner face of the zinc cup are thus added in the form of thallium sulfate or of another salt of monovalent thallium.

EXAMPLE II

A storage battery according to the present invention comprises the combination of zinc and lead dioxide with sulfuric acid as the electrolyte. In this cell, the negative electrode consists of an amalgamated zinc sheet, while the positive electrode is represented in a manner similar to a lead battery by a formed lead dioxide mass. The electrolyte consists of a 20–30% sulfuric acid solution which is nearly saturated with zinc sulfate. Preferably, the concentration of the sulfuric acid is 27% (specific gravity 1.2) and the electrolyte contains 400 grams zinc sulfate per liter. The thallium salt is dissolved in the electrolyte in a quantity corresponding to between 2 and 6 milligrams of thallium per square centimeter of negative electrode surface.

The quantity of thallium salts which is required in order to reduce corrosion of the zinc electrode according to the present invention, is very small. At most, it has been found that a quantity of thallium salts amounting to up to between 1 and 2% of the total weight of the cell will be required. By relating the quantity of the thallium salts to the surface of the zinc electrode, it has been found that excellent results are obtained when a quantity of thallium salt is included in the cell which contains between 2 and 6 milligrams of metallic thallium for each square centimeter of zinc electrode surface.

The following thallium salts have been found to give excellent results according to the present invention, the thallium always being present in its monovalent form: Thallium sulfate, thallium nitrate, thallium chloride, thallium carbonate, thallium hydrophosphate and thallium oxalate. However, the present invention is not to be considered limited to the above mentioned salts of monovalent thallium.

According to a preferred embodiment of the present invention, at least a portion of thallium salts such as are described above is replaced by a monovalent thallium salt with large organic anions, particularly nitrogen-containing organic anions, such as:

Thalliumsulfanilate, $C_6H_6NSO_3Tl$,

Thalliummetanilate, $C_6H_6NSO_3Tl$,

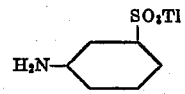

Thalliumnaphthionate, $C_{10}H_8NSO_3Tl$,

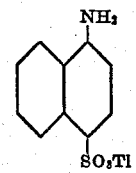

Thalliumnicotinate, $C_6H_4O_2NTl$,

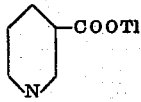

Thus, excellent results have been obtained when the electric cell included the following thallium salts in the indicated quantities:

6 mg. $TlH_2PO_4$+3 mg. Thalliumnicotinate, or
5 mg. TlCl+4 mg. Thalliumsulfanilate, or
3 mg. $Tl_2CO_3$+2 mg. Thalliumnaphthionate, or
2 mg. $Tl_2SO_4$+1 mg. Thalliumsulfanilate, per square centimeter of zinc surface area.

All of the above examples are within the range of between 2 and 6 milligrams of metallic thallium per square centimeter of the zinc electrode surface. It is particularly advantageous that according to the present invention thallium salts can be used in such relatively very small quantities. First, due to the small quantities of thallium salts used, the costs are rather insignificant. Furthermore, the electro-chemical processes in the cell are substantially unaffected by the addition of the small quantities of thallium salts so that the cell retains its full capacity and efficiency.

The quantity of thallium salts to be used according to the invention has been described above as the relationship between the quantity of metallic thallium and the surface area of the zinc electrode. The quantity of the thallium salts to be used in relation to the quantity of the electrolyte varies since in different types of electric cells the quantity of the electrolyte varies in relation to the size of the surface area of the zinc electrode. However, by way of example only it can be stated that in a conventional mono-cell 10 grams of electrolyte consisting of an aqueous solution of ammonium chloride and zinc chloride may for instance contain 200 milligrams of thallium sulfate and 100 milligrams of thallium sulfanilate.

The particular beneficial effect of the organic nitrogen-containing thallium salts may be explained as an additional inhibiting effect of the nitrogen-containing organic anions which are absorbed at the zinc surface and which increase the corrosion resistance of the zinc beyond the resistance which is caused by the effect of the simple or inorganic thallium salts. Thus, substantially all thallium salts formed of monovalent thallium and organic anions can be used according to the present invention, however, it has been found that particularly advantageous results are obtained if organic thallium salts with large nitrogen-containing anions are used either alone, or preferably in a mixture with inorganic thallium salts.

The beneficial effect of the addition of thallium salts to an electrolytic cell has been tested in the following comparison experiments:

*Experiment I*

The corrosion resistance of a zinc electrode in a cell formed with an ammonium chloride/zinc chloride electrolyte to which mercuric chloride has been added was compared with and without the addition of 3 milligrams of thallium sulfate per square centimeter of zinc surface. The electrolyte was thickened with wheat flour in customary manner. The positive electrode consisted of the conventional manganese dioxide-graphite depolarizer mixture which was pressed in form of a sleeve around a carbon rod. It was found that by addition of the thallium salt the corrosion of the zinc electrode was reduced by about 50% so that the storability of the cell was increased to about twice the length of time for which the cell without the thallium salt addition could be stored.

*Experiment II*

By adding to an electrolyte consisting of 1/10 normal sulfuric acid a quantity of thalliumsulfate equal to 5 milligrams per square centimeter of zinc surface, the corrosion of the zinc electrode was reduced by 85% or was equal to only 15% of the corrosion of a similar electrode in a similar electrolyte, however without the addition of the thalliumsulfate.

It will be understood that each of the elements described above, or two or more together, may also find a useful application in other types of electric cells differing from the types described above.

While the invention has been illustrated and described as embodied in an electric cell formed with a zinc electrode, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electric cell of the type consisting of primary and secondary cells, in combination, a zinc electrode having a predetermined surface area; a liquid electrolyte in contact with said zinc electrode; a substance selected from the group consisting of mercury and mercury salts contacting said zinc electrode; and a quantity corresponding to between 2 and 6 milligrams of metallic thallium per square centimeter of said surface area, of thallous sulfate contacting said zinc electrode, whereby corrosion of said zinc electrode is retarded due to the presence of said substance and said thallium sulfate.

2. In an electric cell of the type consisting of primary and secondary cells, in combination, a zinc electrode having a predetermined surface area; a liquid electrolyte in contact with said zinc electrode; a substance selected from the group consisting of mercury and mercury salts contacting said zinc electrode; and a quantity corresponding to between 2 and 6 milligrams of metallic thallium per square centimeter of said surface area, of at least one monovalent thallium salt including a nitrogen-containing organic thallium salt contacting said zinc electrode, whereby corrosion of said zinc electrode is retarded due to the presence of said substance and said thallium salt.

3. In an electric cell of the type consisting of primary and secondary cells, in combination, a zinc electrode having a predetermined surface area; a liquid electrolyte in contact with said zinc electrode; a substance selected from the group consisting of mercury and mercury salts contacting said zinc electrode; and a quantity corresponding to between 2 and 6 milligrams of metallic thallium per square centimeter of said surface area, of a plurality of monovalent thallium salts including at least one inorganic thallium salt and one nitrogen-containing organic thallium salt contacting said zinc electrode, whereby corrosion of said zinc electrode is retarded due to the presence of said substance and said thallium salts.

4. In an electric cell of the type consisting of primary and secondary cells, in combination, a zinc electrode having a predetermined surface area; a liquid electrolyte in contact with said zinc electrode; a substance selected from the group consisting of mercury and mercury salts contacting said zinc electrode; and a quantity corresponding to between 2 and 6 milligrams of metallic thallium per square centimeter of said surface area, of at least one monovalent thallium salt including a nitrogen-containing organic thallium salt selected from the group consisting of thalliumsulfanilate, thalliummetanilate, thalliumnaphthionate and thalliumnicotinate contacting said zinc electrode, whereby corrosion of said zinc electrode is retarded due to the presence of said substance and said thallium salt.

5. In an electric cell of the type consisting of primary and secondary cells, in combination, a zinc electrode having a predetermined surface area; a liquid electrolyte in contact with said zinc electrode; a substance selected from the group consisting of mercury and mercury salts contacting said zinc electrode; and a monovalent thallium salt in a quantity corresponding to between 2 and 6 milligrams of metallic thallium per square centimeter of said surface area contacting said zinc electrode, whereby corrosion of said zinc electrode is retarded due to the presence of said substance and said thallium salt.

6. A primary electric cell as defined in claim 5, and including a depolarizer and an electrolyte contacting said zinc electrode, wherein said thallium salt is located in said depolarizer and said electrolyte.

7. A primary electric cell as defined in claim 5, wherein said thallium salt is located in said electrolyte.

8. An electric cell as defined in claim 5, including a depolarizer and an electrolyte contacting said zinc electrode, wherein said thallium salt is dissolved in said depolarizer and said electrolyte.

9. In an electric cell of the type consisting of primary and secondary cells, in combination, a zinc electrode having a predetermined surface area; a liquid electrolyte in contact with said zinc electrode; a substance selected from the group consisting of mercury and mercury salts contacting said zinc electrode; and a quantity corresponding to between 2 and 6 milligrams of metallic thallium per square centimeter of said surface area, of a monovalent thallium salt at least partially in solid condition contacting said zinc electrode, whereby corrosion of said zinc electrode is retarded due to said substance and said thallium salt in contact with said zinc electrode.

10. In a primary electric cell, in combination, a zinc electrode having a predetermined surface area; and a liquid electrolyte having dissolved therein mercuric chloride in a quantity of about 4 grams per liter of said electrolyte, said liquid electrolyte also containing a monovalent thallium salt in a quantity corresponding to between 2 and 6 milligrams of metallic thallium per square centimeter of said surface area.

11. In an electric cell of the type consisting of primary and secondary cells, in combination, a zinc electrode having a predetermined surface area; and a liquid electrolyte having dissolved therein a predetermined quantity of mercuric chloride, said liquid electrolyte also containing a quantity corresponding to between 2 and 6 milligrams of metallic thallium per square centimeter of said surface area, of monovalent thallium salt.

References Cited in the file of this patent
UNITED STATES PATENTS
1,140,826    Hoppie _____ May 25, 1915